United States Patent [19]

McGee, Jr. et al.

[11] Patent Number: 5,616,090

[45] Date of Patent: Apr. 1, 1997

[54] BIAS CUT, KNIT V-BELT COVER

[76] Inventors: James N. McGee, Jr., 500 Garden Loop, Pleasant Garden, N.C. 27313; Darrel N. Wells, 204 Ridgeway Dr., Greensboro, N.C. 27403

[21] Appl. No.: 529,550

[22] Filed: Sep. 18, 1995

[51] Int. Cl.$^6$ ........................................ F16G 1/04
[52] U.S. Cl. ............................................. 474/267
[58] Field of Search ............................ 474/265–268

[56] References Cited

U.S. PATENT DOCUMENTS

| | | | |
|---|---|---|---|
| 3,724,284 | 4/1973 | Eng et al. ................................ | 74/234 |
| 3,759,112 | 9/1973 | Polshikov et al. ...................... | 74/231 |
| 3,784,427 | 1/1974 | Griffin .................................... | 156/139 |
| 3,853,017 | 12/1974 | White, Jr. et al. ...................... | 74/234 |
| 3,981,206 | 9/1976 | Maranti, Jr. et al. .................... | 74/233 |
| 4,150,581 | 4/1979 | Walters .................................. | 74/238 |
| 4,283,455 | 8/1981 | McGee ................................... | 428/240 |
| 4,308,896 | 1/1982 | Davis ..................................... | 138/126 |
| 4,501,771 | 2/1985 | Long ...................................... | 427/176 |
| 4,501,791 | 2/1985 | Davis ..................................... | 428/286 |
| 4,526,637 | 7/1985 | Long ...................................... | 156/137 |
| 4,632,665 | 12/1986 | Skura ..................................... | 474/205 |
| 4,684,569 | 8/1987 | McGee, Jr. ............................. | 428/286 |
| 4,937,925 | 7/1990 | McGee, Jr. ............................. | 28/112 |
| 5,068,000 | 11/1991 | Lauderdale ............................. | 156/143 |
| 5,224,905 | 7/1993 | Mishima ................................. | 474/258 |
| 5,232,409 | 8/1993 | Kanamori et al. ...................... | 474/260 |
| 5,429,555 | 7/1995 | Beckh ..................................... | 474/267 |
| 5,536,554 | 7/1996 | Wall ....................................... | 474/267 X |

FOREIGN PATENT DOCUMENTS

| | | |
|---|---|---|
| 63-246532 | 10/1988 | Japan . |
| 5-272593 | 10/1993 | Japan . |

*Primary Examiner*—Roger J. Schoeppel
*Attorney, Agent, or Firm*—Rhodes, Coats & Bennett, L.L.P.

[57] ABSTRACT

A cover fabric for power transmission belts, hoses and the like, having improved durability in service, appearance, and handling characteristics. The cover fabric includes a strip of Jersey knit fabric having a plurality of stitch loops forming interconnected loop chains. The interconnected loop chains form wales and courses. The strip is bias cut such that each of the wales are disposed at an angle with respect to the longitudinal axis of the knit fabric strip. The knit fabric cover may include a coating of elastomer, such as polychloroprene, thereon.

Preferably, the wales are disposed at an angle of from about 40° to about 70° with respect to the longitudinal axis, and, more preferably, at an angle of about 55°. Preferably, the wales of the knit fabric cover are disposed at an angle of greater than 90° with respect to the courses, and, more preferably, at an angle of from about 100° to about 110°.

18 Claims, 3 Drawing Sheets

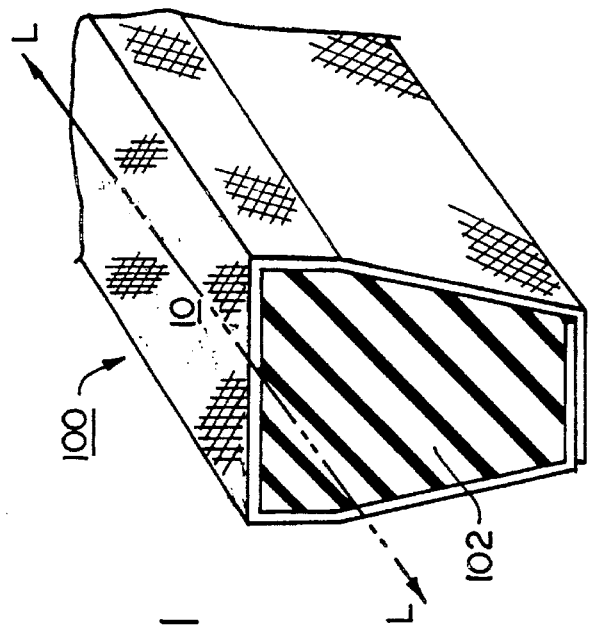
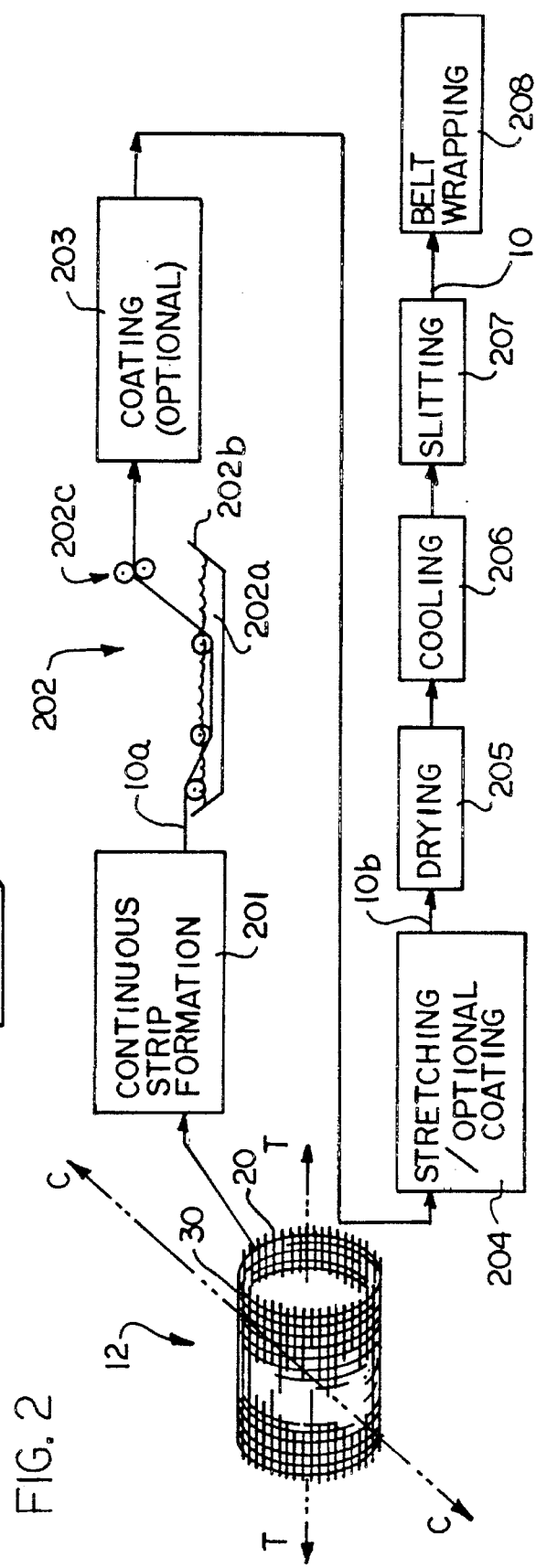
FIG. 1
FIG. 2

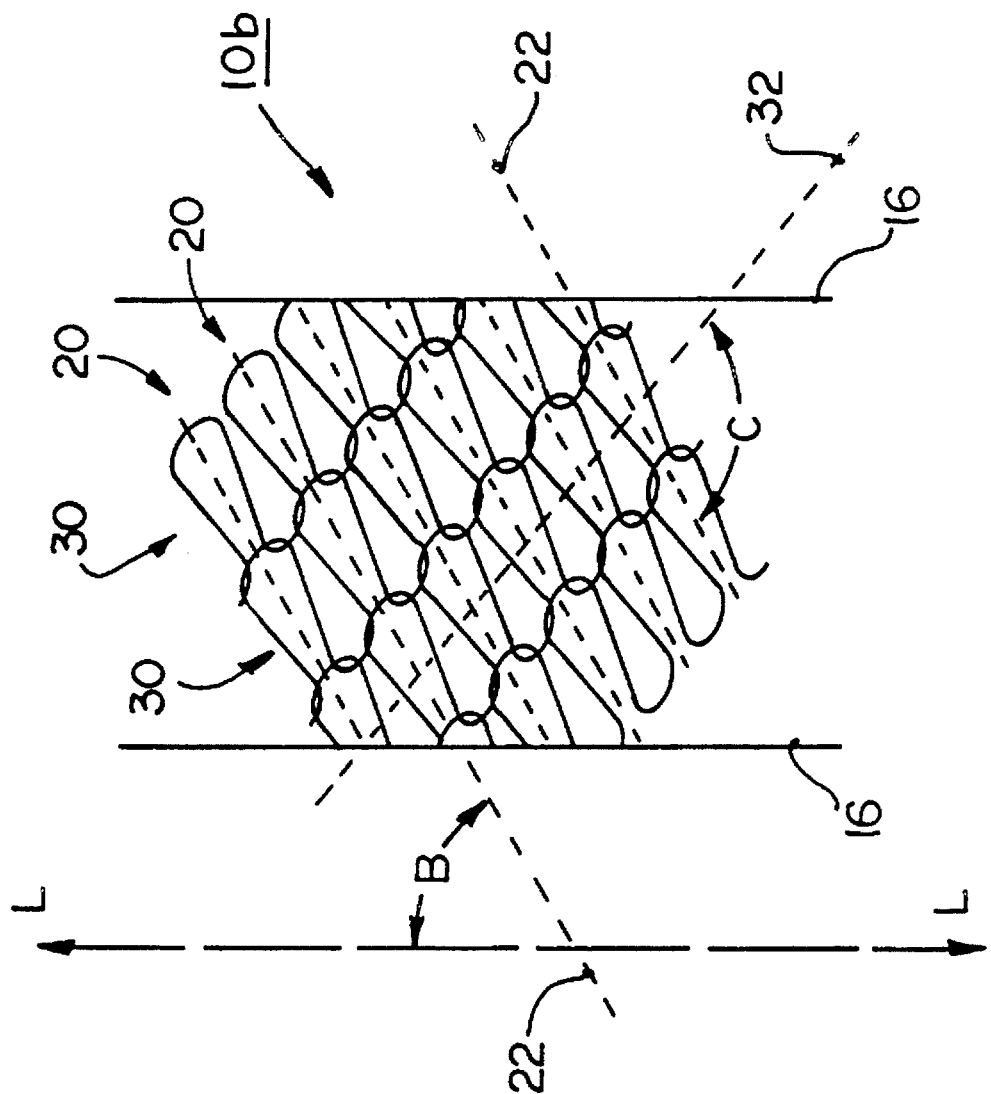

BIAS CUT, KNIT V-BELT COVER

FIELD OF THE INVENTION

The present invention is directed to an improved V-belt cover, and, more particularly, to a knitted V-belt fabric cover which is bias cut such that the wales of the knit fabric run at an angle with respect to the length of the cover.

BACKGROUND OF THE INVENTION

It is known to provide fabric covers for power transmission belts, hoses, or the like to reinforce the same when in service. Such fabric covers serve to significantly enhance the durability of the covered substrate or body. In developing cover fabrics, manufacturers have attempted to maximize the effectiveness of the cover fabrics in augmenting durability. Manufacturers have also sought to improve the appearance performances and handling characteristics of the fabrics. To this end, woven fabrics intended for use as covers for transmission belts, hoses or the like have been bias cut, as discussed below.

Conventional fabric wrapped V-belts have been covered with a plain woven fabric which is rubber coated or calendered and slit/cut on the bias, using various methods of production. Examples of such techniques follow.

U.S. Pat. No. 3,784,427 to Griffin discloses a method and apparatus for manufacturing an elastomer-coated bias cut fabric wherein a tubular woven fabric is cut spirally at a 45° angle to produce a continuous sheet of fabric which is impregnated with a curable binder and transversely stretched on a tenter frame to increase the complementary angle of the warp and weft threads. The binder is cured or otherwise hardened to stabilize the fabric and is subsequently immersion impregnated with an elastomeric composition such as neoprene dissolved in a solvent, dried and cut into strips for application to V-belt cores.

U.S. Pat. No. 4,283,455 to McGee discloses a process which parallels that of Griffin wherein the fabric is impregnated with an elastomeric composition containing a pigment which is removed as the edges of the fabric are abraded to reveal the white threads of the fabric which can then be interpreted as a sign of wear.

One objection to the aforedescribed methods is that the construction of tubular woven fabrics is not consistent. An area of about one half to three fourths inch wide along the folded edge of a tubular woven fabric has a very high yarn count (compared to the balance of the fabric) which shows up every 50 to 60 inches diagonally across the fabric. This area has an appearance that is objectionable on the surface of the V-belts. Moreover, the area of high yarn count can cause a belt to be unbalanced resulting in increased belt vibration. These conditions exist in all tubular woven fabrics whether they are coated, calendered, or otherwise rubberized.

Another method used to produce V-belt cover fabric uses plain weave flat fabric, which is coated or calendered with rubber compound, bias slit at 45° with respect to the length of the fabric, turned and spliced, and then slit into tape widths for wrapping individual belts. With this method, the angle at the yarn crossover is never greater than 90°. As a result, the life of belts that are subjected to back bending is reduced.

Another method for forming V-belt covers uses a plain woven flat fabric before coating or calendering with rubber, as described in U.S. Pat. No. 4,308,896 to Davis and U.S. Pat. No. 5,068,000 to Landerdale. This method requires an extra process which increases the cost. This method, as well as methods using regular square woven fabric and tubular woven fabric bias slit at around 15° to 18°, requires banner or bias slitting, after rubber is applied, into panels which are turned 90° and spliced using an overlap. These overlap splices are typically every 50 to 60 inches in the final cover fabric as used to wrap belts. These methods produce cover fabric having multi-overlap splices on belts. These extra splices in the belt cover can increase drive belt vibration.

Circular knit fabrics with the tube slit open in the conventional method have been tried several times in the past as a V-belt cover fabric as well, with poor success. The knit fabric in itself has sufficient elongation to perform satisfactorily on a V-belt, but when the rubber is cured it locks the knit stitch thereby reducing elongation. Stress placed on the yarn as the belt works results in a very short service life. Examples of V-belts including knit fabric incorporated therein in some manner include those disclosed in U.S. Pat. No. 3,981,206 to Miranti, Jr. et al.; U.S. Pat. No. 3,724,284 to Eng et al.; and U.S. Pat. No. 3,853,017 to White, Jr. et al.

Thus, woven, bias cut fabric covers and knit, conventionally cut fabric covers as described above suffer from many significant shortcomings with regard to handling, appearance, and in-service performance. There exists a need for a fabric cover which does not suffer from or which minimizes these shortcomings. Further, there exists a need for such a cover fabric which improves the durability of transmission belts, hoses and the like beyond that achieved with heretofore known cover fabrics.

SUMMARY OF THE INVENTION

The present invention is directed to a knitted, bias cut cover fabric. It has been found that such a cover fabric provides a surprising and remarkable increase in durability over heretofore employed cover fabrics, including woven, bias cut fabrics and knit, conventionally cut fabrics. Moreover, the cover fabric of the present invention has improved appearance and handling characteristics as compared to cover fabrics of the prior art. The cover fabric is particularly well suited for power transmission belts, for example, V-belts, ribbed belts, synchronous belts, etc., as well as hoses and the like.

More particularly, the cover fabric comprises a strip of knit fabric having a longitudinal axis and including a plurality of stitch loops forming interconnected loop chains. The interconnected loop chains form wales and courses. The fabric strip is bias cut such that each of the wales are disposed at an angle with respect to the longitudinal axis of the fabric strip.

Preferably, the wales of the knit fabric strip are disposed at an angle of from about 40° to about 70° with respect to the longitudinal axis, and more preferably, at an angle of about 55°.

The wales of the fabric strip are preferably disposed at an angle of greater than 90° with respect to the courses of the fabric, and, more preferably, at an angle of from about 100° to about 110°.

Further, the fabric strip is preferably a single Jersey knit.

The cover fabric may further include a coating of elastomer thereon. The elastomer may be, for example, impregnated into the fabric. The elastomer is preferably a polychloroprene.

The present invention is further directed to a power transmission belt including an improved cover fabric as described above. The cover fabric covers and is secured to a belt body having a longitudinal axis. The longitudinal axis of the cover fabric is substantially coextensive with the longitudinal axis of the belt body. When the elongated belt body is subjected to elongative and compressive forces along each of the longitudinal axis of the belt body and the width of the belt body, the bias angle of the opposing wales and courses, and the stitch loops of the knit fabric open and close responsive to such forces. The cover fabric thereby serves to maintain the shape of the belt body while minimizing deterioration of the cover fabric.

An object of the present invention is to provide an improved fabric for covering power transmission belts, hoses, and the like.

An object of the present invention is to provide such a cover fabric having increased durability in use.

A further object of the present invention is to provide a cover fabric having a desirable appearance. Accordingly, an object of the present invention is to provide a cover fabric which has relatively few blemishes.

Moreover, an object of the present invention is to provide a cover fabric which does not require sizing.

A related object of the present invention is to provide such a cover fabric which is relatively soft and has low resilience, allowing the fabric to be more easily applied to a power transmission belt body or the like.

The preceding and further objects of the present invention will be appreciated by those of ordinary skill in the art from a reading of the Figures and the detailed description of the preferred embodiment which follow, such description being merely illustrative of the present invention.

BRIEF DESCRIPTION OF THE DRAWINGS

FIG. 1 is a schematic, perspective view of a V-belt formed according to the present invention;

FIG. 2 is a flow diagram of the preferred method for forming a V-belt cover according to the present invention;

FIG. 5 is a schematic, fragmentary view of the fabric strip subsequent to the stretching step and as applied to the V-belt body.

DETAILED DESCRIPTION OF THE PREFERRED EMBODIMENT

According to the present invention, an improved V-belt cover and laminate fabric strip, generally denoted by the numeral 10, is provided. With reference to FIG. 1, fabric 10 is adapted for use on, for example, a V-belt body 102 to provide an exceptionally durable V-belt 100. "V-belt" as used herein will be understood to mean a power transmission belt. Fabric 10 may be utilized in any other suitable application such as, for example, hoses and other types of belts.

Figure 4:
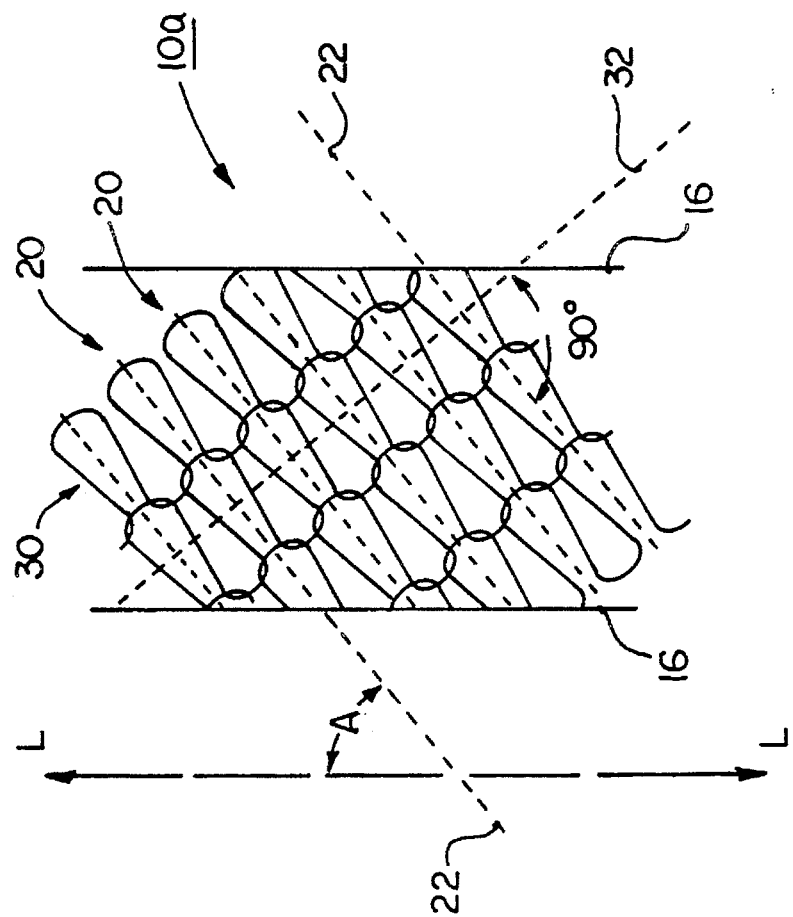
FIG. 4 is a schematic, fragmentary view of the fabric strip prior to the stretching step.
Figure 3:
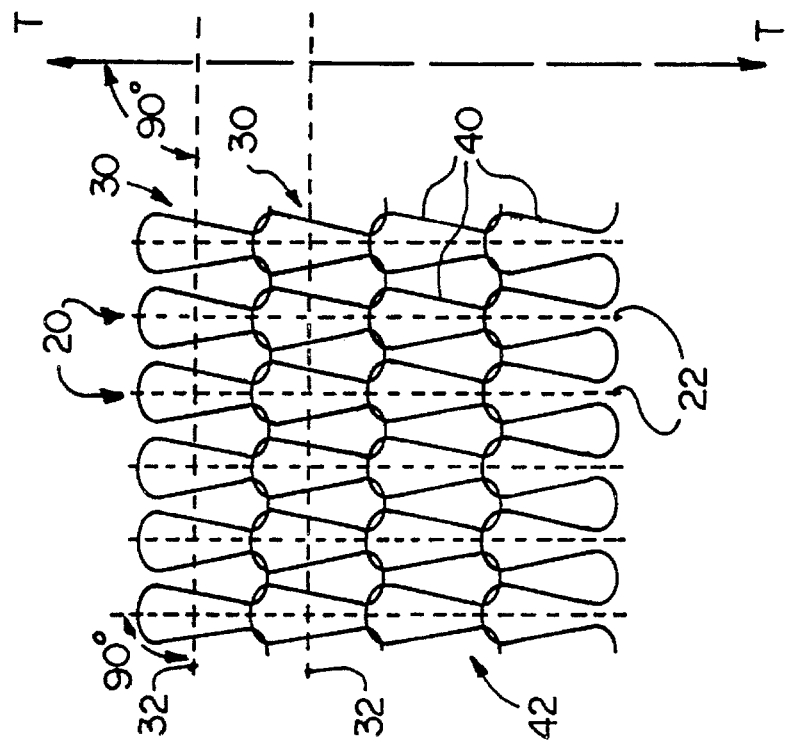
FIG. 3 is a schematic, fragmentary view of the knit fabric while in the tube formation.

Knit cover fabric strip 10 includes a plurality of wales 20 and courses 30, depicted schematically in FIG. 1 and shown in greater detail in FIGS. 3–5. The side edges of the fabric strip 10 run parallel to reference lines 16 and along a bias with respect to the grain of the fabric. The angle of the bias is preferably chosen such that the wales 20 are disposed at an angle of from about 40° to about 70° with respect to the longitudinal axis L—L of fabric strip 10, and, more preferably, at an angle of about 55° with respect thereto. Longitudinal axis L—L is also preferably the longitudinal axis of the belt. Although any suitable knit formation may be utilized, single Jersey knit is preferred. The construction of fabric strip 10 will be further understood from the discussion below regarding the formation and treatment of the fabric.

V-belts including cover fabric strip 10 as described herein provide many advantages over V-belts of the prior art, as discussed in more detail below. Of primary benefit is a substantial improvement in the durability of the V-belts which is attributable to the combination of knit fabric and bias cut of the fabric. The bias angle of the opposing wales and courses changes and the loops of the fabric strip of the present invention open and close as the V-belt is extended and compressed. This allows for greater flex of the V-belt body both lengthwise and widthwise with less stress on the fibers of the fabric. By stretching as needed through a wider range of extensions, both lengthwise and widthwise, the fabric remains intact so that it continues to hold the shape of and reinforce the V-belt body.

Cover fabric strip 10 may be formed as follows. First, with reference to FIG. 2, knit fabric tube 12 is formed on a circular knit machine in conventional fashion. Circular knit fabrics having various type stitches, various yarn sizes, and various spun and filament fibers may be used. As noted above, a single Jersey knit is preferred.

With reference to FIGS. 2 and 3, tube 12 includes a plurality of stitch loops 40 which form interconnected loop chains 42, which in turn form a plurality of generally parallel courses 30 and a plurality of parallel wales 20. As best seen in FIG. 3, each course 30 includes an axis 32 which extends substantially perpendicular to the longitudinal axis T—T of tube 12. Each wale 20 includes an axis 22 which extends substantially parallel to the longitudinal axis T—T of tube 12. When the fabric is in the tube form as shown, axes 22 and 32 define an angle of about 90° therebetween.

With reference to FIGS. 2 and 4, in step 201, a strip 10a having width of about 65 to 70 inches is continuously cut from tube 12 by hand or suitable cutting apparatus along bias cut line C—C as shown in FIG. 2. Cut line C—C is disposed at a prescribed angle with respect to the longitudinal axis T—T of the knit tube. The prescribed angle is preferably in the range of from about 30° to about 60°, and, more preferably, is about 45°.

With continued reference to FIG. 4, strip 10a has a longitudinal axis L—L. Reference lines 16 run parallel to the edges formed by the aforementioned cut line C—C and show the relationship between the side edges and the threads of the fabric. Wale axes 22 are disposed at an angle A with respect to axis L—L. It will be appreciated that angle A is the same size as the angle between line C—C and longitudinal axis T—T.

Slitting the circular knit fabric tube at the above-described angles produces equal forces pulling to each side of the fabric, resulting in the elimination or substantial reduction of curling of the edges of the fabric. This is to be contrasted with conventional slitting of circular knit fabric (i.e., along the length of the tube) wherein the edges roll up in the direction of the backside of the fabric (i.e., toward the inside of the tube). Further, when a circular knit fabric is conventionally slit, the ends of the fabric curl or roll up in the direction of the face side. Because the tendency of the edges to curl or roll up is minimized or eliminated by the bias cut according to the present invention, the resulting knit fabric may be successfully impregnated, coated, dried, etc., with a minimal loss from curled up edges.

In step 202, the bias slit knit fabric 10a is impregnated to encapsulate the individual fibers with a solvated or aqueous oil resistant elastomer such as NEOPRENE™, a polychloroprene product available from DuPont. This is preferably accomplished by immersing strip 10a in a fluid mix 202a in a conventional dip tank 202b or the like. Strip 10a is then passed through standard textile squeeze or pad rolls 202c for leveling and removing excess fluid mix.

In step 203, the fabric is coated with a viscous oil resistant compound, for example, NEOPRENE™ polychloroprene available from DuPont. A rubber applicator may be used to coat.

In step 204, the fabric strip 10a is overfed onto a pin tenter at from about 10% to about 60% overfeed, and preferably at about 35% overfeed. The width is pulled out from about 10% to about 50%, and preferably at about 35%, to produce a stable fabric widthwise with low elongation. The preferred 35% overfeed and 35% width increase changes the angle of the courses off the wales from 90° to about 100° to 110° which increases the elongation in the machine direction to approximately 100% to 150% at break and reduces the elongation in the cross machine direction to approximately 30% to 60% at break.

With reference to FIG. 5, the resulting fabric strip 10b has a width of about 80 to 86 inches. Wale axes 22 are reoriented with respect to the longitudinal axis L—L so that axes 22 define an angle B with respect to axis L—L, angle B being greater than angle A. Further, course axes 32 are reoriented with respect to wale axes 22 such that a new angle C is defined therebetween, angle C being from about 100° to about 110°. The preferred 35% overfeed and 35% width increase changes the bias angle by about 10° so that, if angle A is 45°, angle B is about 55°.

Alternatively, bias slit fabric 10a can be overfed onto the tenter frame and the width pulled out with no impregnation or coating applied before pinning (i.e., step 203 is eliminated). Fabric 10a is instead coated between the tenter frame pins (i.e., during step 204) with a dual reverse roll coater or the equivalent using a low viscosity mix to achieve thorough mix penetration.

In step 205, fabric strip 10b is dried (not cured) and batched up with a release liner to prevent the coatings from sticking together. The fabric is thereafter cooled in step 206.

In step 207, strip 10b is cut into a strip 10 of suitable width for the intended purpose. Strip 10, in step 208, is wrapped about belt body 102 in conventional fashion (FIG. 1), albeit with the advantages in handling and performance as set forth below.

When the resulting fabric strip 10 is used as a cover on V-belt 100, the elongation in the cross machine direction allows the fabric to work in harmony or stretch and contract with belt body 102 as the belt goes around pulleys and back idlers, while still providing sufficient reinforcement to hold belt 100 in its V-shape. Elongation in the width direction can be controlled at levels at least as low as for woven, biased fabric.

The high elongation and contraction of the bias slit, knit fabric in the machine direction (i.e., along axis L—L) due to angle change and the knit stitch loop opening and closing allows the fabric to work with V-belt 100 with very little stress placed on the fibers. This high elongation in the length direction increases the belt life over belts covered with conventional fabric due to less stress placed on the cover fabric fibers as the belt goes over or around back idlers. Elongation in the length direction can be controlled to about 110% to 120% (i.e., at levels up to 100% higher than for woven, biased fabric).

Another advantage from the high elongation and contraction in the length direction of the biased knit is the resulting low resistance to belt flex. The lower resistance to belt flex reduces heat build up which increases belt life.

The V-belt cover according to the present invention provides further improvements over conventional cover fabrics. For example, the appearance of the strip of bias slit, knit fabric is consistent. The structural and operating characteristics of the fabric are consistent and continuous throughout its length. Splices as required every 50–60 inches on some conventional cover fabrics are not needed. As a result, a continuous length of fabric may be provided, allowing greater belt integrity and better appearance. As noted above, less stress is placed on the yarns of the fabric because the knit stitch loops open and close along with the angle change as the associated V-belt flexes.

The knit fabric does not have or require any added sizing (e.g., starch, PVA, etc.). As a direct result, improved adhesion to rubber is achieved (on the order of 10% better adhesion). Aqueous adhesion promoters penetrate the fabric much better than for sized, woven fabric of the same yarn. Moreover, rubber penetration into the yarn bundles is much higher because of the absence of sizing. This increases the abrasion resistance of the fabric resulting in increased life.

The absence of sizing also provides a softer cover fabric. The softer fabric flips around the associated V-belt core more easily, providing a tighter wrap. The lower resilience (near zero) of the fabric results in a reduced tendency to pull the overlap splice on the belt apart before it is cured, which allows the fabric to wrap satisfactorily with about one half the green tack needed for conventional woven, biased fabric.

The tighter wrap also results in less compression of the fabric during cure in a mold and, hence, improved V-belt appearance. Further, there are substantially no blemishes in the knit fabric as compared to tubular, woven, biased fabric. The back of the bias slit knit has a preferred appearance on the outside of a belt. However, either side of the knit fabric can be placed on the outside.

Bias slit, knit V-belt covers formed as described above provide substantially improved wear characteristics when compared with standard biased, woven fabrics, as demonstrated by the following examples.

INVENTIVE EXAMPLE #1

Using 10.0/1, 50/50 cotton/polyester yarn on a 13 cut knitting machine, a tube was knitted using a single stitch Jersey knit at 18/19 wales/inch by 24/26 courses/inch to a greige weight of 6.5 oz./yd.$^2$. This tube was bias slit at a 45° angle. The bias slit fabric was impregnated with a 26% solids solvated neoprene rubber, coated with a high viscosity (50,000 cps) neoprene rubber, overfed 35% onto a pin frame, pulled the width out 35%, and then dried. The fabric was batched up with a 0.003 inch embossed polyethylene release liner to prevent the tacky rubber coating from sticking together. The coated fabric was then slit to tape widths of $^{19}/_{16}$ inches wide.

These tapes were wrapped on one half of a one half inch wide V-belt with the other half wrapped with conventional wide angle biased woven fabric as a control standard. The belts were cured in a conventional ring cure mold.

These belts were tested on a belt tester with two 90° back bends, 50% wrap on a two inch pulley, and 50% wrap on two, five inch pulleys, with 100 pound tension at 10 HP load for 175 hours. The conventional biased woven cover fabric had several breaks in the fabric on the inside of the belt.

There was no fabric deterioration detectable on the bias slit knit cover fabric.

INVENTIVE EXAMPLE #2

Using 14/1, 50/50 cotton/polyester yarn on an 18 cut knitting machine, a tube was knitted using a single stitch Jersey knit at 20/24 wales/inch by 34/36 courses/inch to a greige weight of 5.8 oz./yd.$^2$. This fabric was bias slit at a 45° angle. The bias slit fabric was impregnated with a 26% solids solvated neoprene rubber, coated with a high viscosity (50,000 cps) neoprene rubber, overfed 35% onto a pin frame, pulled the width out 35%, and then dried. The fabric was batched up with a 0.003 inch embossed polyethylene release liner to prevent the tacky rubber coating from sticking together. The coated fabric was then slit to tape widths of 19/16 inches wide.

These tapes were wrapped on one half of a one half inch wide V-belt with the other half wrapped with conventional wide angle biased woven fabric as a control standard. The belts were cured in a conventional ring cure mold.

These belts were tested on a belt tester with two 90° back bends, 50% wrap on a two inch pulley and 50% wrap on two, five inch pulleys with 100 pounds tension at 10 HP load for 355 hours. This belt broke in the area covered with the standard biased woven fabric. The standard biased woven fabric had several complete breaks in it from fatigue. There was no fabric deterioration detectable on the bias slit knit cover fabric.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A cover fabric for power transmission belts and other endless belts and hoses, comprising:
   a) a strip of knit fabric including a plurality of stitch loops forming interconnected loop chains, said interconnected loop chains forming wales and courses, said strip having a longitudinal axis; and
   b) said fabric strip being bias cut such that each of said wales are disposed at an angle with respect to said longitudinal axis.

2. The cover fabric of claim 1 wherein said wales are disposed at an angle of from about 40° to about 70° with respect to said longitudinal axis.

3. The cover fabric of claim 2 wherein said loop chains form a single Jersey knit.

4. The cover fabric of claim 1 wherein said wales are disposed at an angle of 55° with respect to said longitudinal axis.

5. The cover fabric of claim 4 wherein said loop chains form a single Jersey knit.

6. The cover fabric of claim 1 further including a coating of elastomer on said fabric.

7. The cover fabric of claim 6 wherein said elastomer is a polychloroprene.

8. The cover fabric of claim 1 wherein said wales are disposed at an angle of greater than 90° with respect to said courses.

9. The cover fabric of claim 1 wherein said wales are disposed at an angle of from about 100° to about 110° with respect to said courses.

10. A power transmission belt comprising:
    a) an elongated belt body having a longitudinal axis and a width;
    b) a cover fabric covering and secured to said belt body and comprising:
       i) a strip of knit fabric including a plurality of stitch loops forming interconnected loop chains, said interconnected loop chains forming wales and courses, said strip having a longitudinal axis substantially coextensive with said longitudinal axis of said belt body; and
       ii) said fabric strip being bias cut such that each of said wales are disposed at an angle with respect to said longitudinal axis of said strip; and
    c) whereby, when said elongated belt body is subjected to elongative and compressive forces along each of said longitudinal axis of said belt body and said width of said belt body, said stitch loops open and close responsive to said elongative and compressive forces thereby maintaining the shape of said belt body while minimizing deterioration of said cover fabric.

11. The belt of claim 10 wherein said wales are disposed at an angle of from about 40° to about 70° with respect to said longitudinal axis of said strip.

12. The belt of claim 11 wherein said loop chains form a single Jersey knit.

13. The belt of claim 10 wherein said wales are disposed at an angle of about 55° with respect to said longitudinal axis of said strip.

14. The belt of claim 13 wherein said loop chains form a single Jersey knit.

15. The belt of claim 10 further including a coating of elastomer on said fabric.

16. The belt of claim 15 wherein said elastomer is a polychloroprene.

17. The belt of claim 10 wherein said wales are disposed at an angle of greater than 90° with respect to said courses.

18. The cover fabric of claim 10 wherein said wales are disposed at an angle of from about 100° to about 110° with respect to said courses.

* * * * *